United States Patent
Pineau et al.

(10) Patent No.: US 10,023,704 B2
(45) Date of Patent: *Jul. 17, 2018

(54) USE OF A FINE AQUEOUS POLYMER DIPERSION FOR THE IMPREGNATION OF NATURAL FIBRES

(71) Applicant: ARKEMA FRANCE, Colombes (FR)

(72) Inventors: Quentin Pineau, Evreux (FR); Gilles Hochstetter, L'Hay les Roses (FR); Marc Audenaert, Bernay (FR)

(73) Assignee: ARKEMA FRANCE, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/310,626

(22) PCT Filed: May 7, 2015

(86) PCT No.: PCT/FR2015/051220
§ 371 (c)(1),
(2) Date: Nov. 11, 2016

(87) PCT Pub. No.: WO2015/173498
PCT Pub. Date: Nov. 19, 2015

(65) Prior Publication Data
US 2017/0073480 A1 Mar. 16, 2017

(30) Foreign Application Priority Data

May 12, 2014 (FR) ...................... 14 54213

(51) Int. Cl.
| C10C 3/02 | (2006.01) |
| C08J 5/04 | (2006.01) |
| B29B 15/12 | (2006.01) |
| B29B 13/06 | (2006.01) |
| B29K 77/00 | (2006.01) |

(52) U.S. Cl.
CPC .............. C08J 5/045 (2013.01); B29B 13/06 (2013.01); B29B 15/12 (2013.01); B29B 15/122 (2013.01); B29K 2077/00 (2013.01); C08J 2375/04 (2013.01); C08J 2377/06 (2013.01)

(58) Field of Classification Search
CPC ................................ C08J 5/045; B29B 13/06
See application file for complete search history.

(56) References Cited

U.S. PATENT DOCUMENTS

| 4,292,105 A | 9/1981 | Taylor |
| 2002/0176979 A1 | 11/2002 | Evans |

| 2009/0202829 A1* | 8/2009 | Fox ........................... B29B 9/14 428/375 |
| 2013/0115836 A1* | 5/2013 | Touraud ................ B29C 70/465 442/59 |
| 2013/0167502 A1* | 7/2013 | Wilson .................. B29C 70/025 57/210 |
| 2015/0126646 A1 | 5/2015 | Hochstetter et al. |
| 2016/0347009 A1* | 12/2016 | Gaillard .................. B29B 15/12 |
| 2017/0013484 A1* | 1/2017 | Liu ......................... H04L 43/00 |

FOREIGN PATENT DOCUMENTS

| EP | 0 013 244 A1 | 7/1980 |
| EP | 0 324 680 A2 | 7/1989 |
| FR | 2 223 173 A1 | 10/1974 |
| FR | 2 781 492 A1 | 1/2000 |
| FR | 2 973 802 A1 | 10/2012 |
| GB | 512 558 A | 9/1939 |
| GB | 644 648 A | 10/1950 |
| GB | 1 424 168 A | 2/1976 |
| WO | WO 03/091006 A2 | 11/2003 |
| WO | WO 2013/178955 A1 | 10/2013 |

OTHER PUBLICATIONS

International Search Report (PCT/ISA/210) dated Jul. 24, 2015, by the European Patent Office as the International Searching Authority for International Application No. PCT/FR2015/051218.
Written Opinion (PCT/ISA/237) dated Jul. 24, 2015, by the European Patent Office as the International Searching Authority, for International Application No. PCT/FR2015/051218.
International Search Report (PCT/ISA/210) dated Jul. 23, 2015, by the European Patent Office as the International Searching Authority for International Application No. PCT/FR2015/051220.
Written Opinion (PCT/ISA/237) dated Jul. 23, 2015, by the European Patent Office as the International Searching Authority for International Application No. PCT/FR2015/051220.

* cited by examiner

Primary Examiner — Hannah J Pak
(74) Attorney, Agent, or Firm — Buchanan Ingersoll & Rooney P.C.

(57) ABSTRACT

The use of an aqueous polymer dispersion including at least one amorphous polymer having a Tg varying between 55° C. and 175° C. or a semi-crystalline polymer having a melting point varying between 70° C. and less than 220° C., the weight concentration of the polymer in the dispersion varying between 5 and 50%, with the polymer particles having an average size of less than 10000 nm, as a binder for impregnating strands or strips of natural fibers, in particular flax fibers, with said polymer being incorporated in the core of the fiber bundle forming the strand or strip and thereby binding the fibers together.

20 Claims, 1 Drawing Sheet

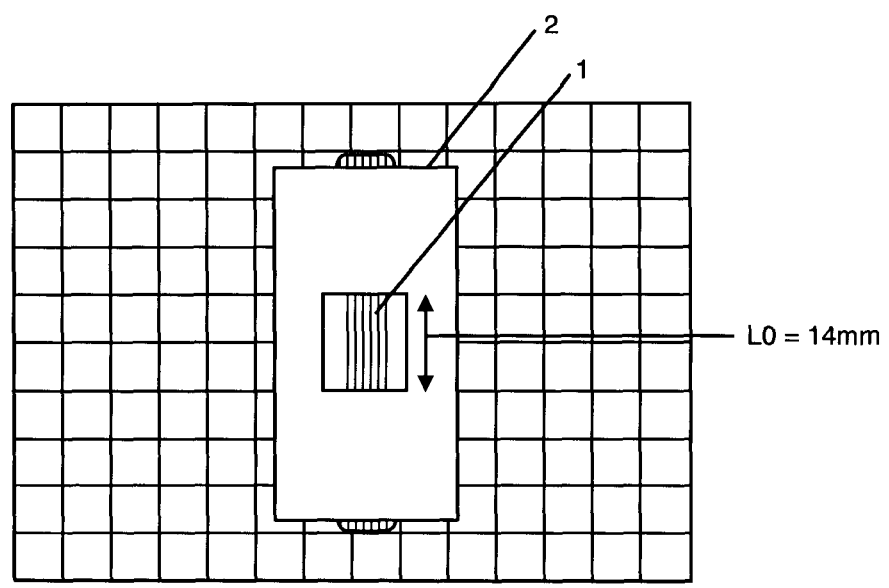

USE OF A FINE AQUEOUS POLYMER DIPERSION FOR THE IMPREGNATION OF NATURAL FIBRES

The present invention relates to the use of a specific aqueous dispersion in the treatment by impregnation of rovings or ribbons of natural fibers of plant origin and in particular flax fibers, more particularly for the consolidation of said rovings of fibers allowing them to have an improved mechanical strength during the processing thereof or the use thereof for producing unidirectional reinforcements, nonwovens or wovens, that will subsequently be impregnated with a resin in order to produce composite materials, without the need to twist the yarns (without twisted yarns).

Natural fibers such as flax, hemp or sisal fibers, and in particular flax fibers, are not continuous fibers, but are discontinuous fibers linked to one another by transverse fibrils (pectins). This fact creates a need to search for a means to reinforce the mechanical strength of the rovings or yarns or ribbons of natural fibers, contrary to the case of glass or carbon fibers which are continuous. For fibers for the textile industry, natural fibers are twisted so as to constitute a yarn which has sufficient mechanical strength for the intended use. The challenge is to obtain this improved mechanical strength of the fiber roving without twisting the fibers. When a natural reinforcement for manufacturing composites is sought, it is sought to preserve as much as possible the intrinsic qualities of natural fibers, in particular of flax fibers, and for this reason, the fibers are not twisted: the fiber rovings, i.e. bundles of natural fibers or ribbons of natural fibers, then consist of fibers for technical use having better mechanical properties than fibers for textile use, since they have not been damaged by the twisting step used to manufacture the fibers for textile use. Consequently, the obtaining of a roving or a ribbon of technical natural fibers sufficiently resistant so as not to be broken during the operations for manufacturing these rovings or ribbons, requires the production of the rovings or the ribbons of fibers of high grammage expressed in tex, much higher than what is done with glass or carbon fibers. One tex corresponds to a grammage or linear weight (per unit of length) equal to 1 g/km or $10^{-6}$ kg/m. This higher grammage results in unidirectional fibrous reinforcements or nonwovens or wovens that are coarser, comprising imperfections, and thus affecting the final mechanical strength of composites comprising natural fibers such as flax fibers. It is also impossible, with this type of reinforcement based on natural fibers, to produce lightweight sandwich panels comprising skins of natural-fiber composite, in particular flax fiber composite, of very small thickness. Thus, the purpose of a flax fiber ribbon or roving of lower grammage is to produce composites comprising virtually continuous natural fibers of greater mechanical strength and to produce lightweight sandwich panels comprising composite reinforcements based on technical natural fibers, which have a higher performance level than those produced from textile fibers. Consequently, there is a need for consolidation and reinforcement of said fiber rovings without recourse to twisting of the fibers and while seeking a binder capable of penetrating to the core of the rovings of said fibers in order to bind the fibers to one another with sufficient cohesion to improve the mechanical strength of the roving.

Because of their matrix, thermoplastic composites already have the advantage over thermoset-matrix composites of being recyclable and of being easily processable or in an easy form. The reinforcement with natural fibers adds an additional advantage to the recyclability, which is the plant origin of the fibers: it is an important element to be taken into consideration in the ecological context, where the aim is to use environmentally friendly renewable raw materials. Furthermore, compared to thermoplastic composites with glass fiber reinforcement, thermoplastic composites with fibrous reinforcement of natural origin, in particular based on flax fibers, make it possible to lighten said composites for equivalent performance level. This is because the density of flax fibers (1.5) is approximately 40% lower than that of glass fibers, hence the growing interest in and need to have rovings or ribbons of natural fibers, in particular flax fibers, with consolidation between the fibers of the bundle and improved mechanical strength without twisting.

Application GB 512558 describes the treatment of cotton fibers with a dispersion of rubber or of synthetic resin with a low polymer content ranging from 2% to 10% without the need to twist the cotton yarns for tensile mechanical strength. After impregnation under pressure, the surplus of dispersion is eliminated by pressurized air jet, with few polymer particles remaining on the fibers after elimination of the surplus and drying of the fibers. No piece of data on the polymer content remaining between the fibers is specified and no specific examples mentioned regarding the production conditions and regarding the specific results obtained. Even less, said document neither describes the specific problem with natural fibers such as flax fibers, as set out above for the needs of reinforcing thermoplastic matrices of thermoplastic composite materials, nor suggests a specific solution to said problem.

Furthermore, application EP 0324680 describes a process for preparing a reinforced thermoplastic semi-product, such as a polypropylene-based material reinforced with glass fibers. According to said document, the wetting of the reinforcing fibers is all the better if the fibers remain in unit form and not in the form of basic rovings or yarns. More particularly, the process described comprises the steps of first preparing an aqueous coating composition comprising a resin divided into small portions and a viscosity-regulating agent and optionally additives, and then of coating one face of a mat of reinforcing fibers dispersed in unit form, with the aqueous coating composition, followed by drying to obtain a semi-product in the form of a sheet and then optionally melting of said resin. No technical problem linked to the natural fibers, such as flax fibers, is mentioned, nor is any solution to this problem suggested in said document, which relates more to that of a semi-product based on a polyolefin reinforced with glass fibers.

FR 2223173 also describes a process for preparing sheets or ribbons of fibers impregnated with resin using an aqueous dispersion of resin, in particular thermosetting resin, with dispersion after thickening using a thickener. Once again, the fibers involved are not natural fibers such as flax fibers, and the problem is not set out, nor is the solution thereto suggested. A similar process is described by EP 0013244.

Application WO 031091006 describes a process for manufacturing a material composed of natural fibers pre-impregnated with organic resin and provided in the form of a solid and flexible yarn or ribbon. The natural fibers include flax, hemp or sisal fibers or fibers of any other fibrous plant.

BRIEF DESCRIPTION OF THE DRAWINGS

FIG. 1 is a view of a flax roving glued onto a cardboard frame for testing tensile mechanical properties.

The present invention makes it possible to solve the technical problems set out above with respect to the prior art with a specific process for impregnating rovings or ribbons of natural fibers where this problem arises, this impregnation taking place at the core by means of a specific polymer aqueous dispersion thus making it possible for said polymer to bind the fibers of said rovings or of said ribbons to one another at the core of the fiber bundle, and to consolidate said fibers through this specific impregnation with the fine particles of polymer used after melting. This impregnation can later and directly result in a pre-impregnated fibrous reinforcement, roving or ribbon of low grammage that can be used for the manufacture of composite materials.

The flexibility of the solution of the present invention enables it to be integrated into a continuous production line for said fibrous reinforcement based on natural fibers such as flax fibers, ranging from the treatment of natural fibers from open fields, to the manufacture of a pre-impregnated and calibrated roving or ribbon.

The present invention thus covers the use of said specific aqueous polymer dispersion comprising at least one amorphous or semi-crystalline polymer, as binder for impregnating rovings or ribbons of natural fibers, in particular rovings or ribbons of flax fibers, in which use, said polymer:
- is incorporated into the core of the bundle of fibers making up said roving or said ribbon and thus binding said fibers to one another,
- if it is amorphous, has a Tg ranging from 50° C. to 175° C., preferably from 80° C. to 150° C., and if it is semi-crystalline, has a melting point ranging from 70° C. to less than 220° C., preferably greater than 90° C. and up to 190° C., more preferentially of from 100° C. to 170° C.,
- is present in said dispersion in a content by weight ranging from 5% to 50% with particles in dispersion having a number-average size of less than 10 000 nm, preferably ranging from 100 nm to 5000 nm and more preferentially from 50 to 500 nm,
- is chosen from: copolyamides, polyesters, polyurethanes, poly(meth)acrylates including copolymers, polyolefins or fluorinated polymers including fluorinated copolymers.

The polymer dispersion according to the invention is a dispersion of polymer particles that is fine through the limitation of the size of said particles, such that said particles easily diffuse to the core of the bundle (of the roving) of natural fibers in order to consolidate said fibers (bind them to one another).

Said dispersion, as meant according to the invention, comprises both a dispersion of polymer dispersed using a dispersant or emulsifier or surfactant after it has been polymerized by any technique whatsoever, that will also be referred to as "post-emulsion", or self-dispersion without dispersant, emulsifier or surfactant through the presence of ionic functions or ionic function precursors, for example carboxylic acid functions neutralized in salt form, where the term "aqueous polymer dispersion" also encompasses a polymer emulsion or "polymer latex" obtained by a technique well known to those skilled in the art, such as the previous techniques of radical polymerization in emulsion in water from a monomer composition in emulsion using at least one surfactant.

The polymers of said dispersion according to the invention can be homopolymers or copolymers based on at least two monomers or repeating units or they can be blends of polymers compatible with one another. The term "compatible polymers" means miscible with one another, without phase separation.

According to one particular option, said polymer is a poly(meth)acrylate, including a (meth)acrylate copolymer, in particular with at least one other (meth)acrylic comonomer, which polymer is functionalized with acid functions, or it is a fluorinated polymer, including fluorinated copolymers, grafted with reactive functions, and said aqueous dispersion is an aqueous dispersion obtained by emulsion polymerization in the presence of a surfactant, said reactive functions can react with said natural fibers and more particularly with flax fibers. Polymer dispersions with poly(meth)acrylate polymer or (meth)acrylate copolymer will be referred to as acrylic dispersions or acrylic emulsions.

According to another option, said polymer is a polyurethane formed from an ionic polyisocyanate, in particular diisocyanate, prepolymer dispersed in water with chain extension in an aqueous medium. In general, such a prepolymer is obtained by reacting a diol bearing a carboxylic or sulfonic acid function, with a polyisocyanate, in particular diisocyanate, and optionally another diol without an ionic function, in an organic medium, in particular with a solvent that is easy to remove by evaporation. The dispersion in water is carried out after at least partial neutralization of said acid function with an inorganic base such as aqueous ammonia or an alkali metal hydroxide, or an organic base such as a tertiary amine. The chain extension can be carried out with a chain extender bearing functions that are reactive with the isocyanate functions of said prepolymer, for instance a diamine. The organic solvent can be removed by evaporation in order to recover the final aqueous dispersion of polyurethane, the dry extract of which can be adjusted by dilution in water.

According to another particular and preferred possibility, said polymer is dispersible or dispersed in powder form in an aqueous medium without surfactant, and preferably, said polymer in powder form bears ionic groups or groups that are precursors of ionic groups, in particular by neutralization in water during the preparation of said dispersion. In particular, said polymer is a copolyamide, preferably bearing sulfonic carboxy end groups or amine end groups, more preferentially having a content of said groups ranging from 50 to 500 µeq/g (microequivalents/g), in particular from 100 to 250 µeq/g. According to one option, said copolyamide bears amine groups, preferably primary amine groups, neutralized in ammonium form by an acid, preferably a Bronsted acid, which is more preferentially phosphorus-comprising.

According to another option, said copolyamide bears carboxy groups neutralized, in salt form, by a base.

According to one particular option, the copolyamide is semi-crystalline and has a melting point of less than or equal to 150° C.

Said copolyamide can comprise at least one of the following units: 5.9, 5.10, 5.12, 5.13, 5.14, 5.16, 5.18, 5.36, 6, 6.9, 6.10, 6.12, 6.13, 6.14, 6.16, 6.18, 6.36, 9, 10.6, 10.9, 10.10, 10.12, 10.13, 10.14, 10.16, 10.18, 10.36, 11, 12, 12.6, 12.9, 12.10, 12.12, 12.13, 12.14, 12.16, 12.18, 12.36, 6.6/6, 11/10.10 and mixtures thereof, and preferably comprises at least one unit chosen from: 11, 12, 10.10, 6, 6.10, 6.12, 10.12, 6.14, 6.6/6, 11/10.10 and mixtures thereof.

According to another possibility, said copolyamide can be chosen from: PA 6/6.6/12, PA 6/6.6/11/12, PA 6/12, PA 6.9/12, PA Pip.9/Pip.12/11, PA 6/IPD.6/12, PA IPD.9/12, PA6/MPMD.12/12, PA 6/6.12/12, PA 6/6.10/12, PA 6/Pip.12/12, PA 6/6.6/6.10/6.I, PA 6.10/Pip.10/Pip.12, PA 6/11/12, PA Pip.12/12, PA IPD.10/12, PA Pip.10/12, PA 6/11, PA Pip.10/11/Pip.9, PA 6/6.6/6.10, PA 6/6.10/6.12 and mixtures thereof. IPD is isophorone diamine and Pip is piperazine.

According to another possibility, said copolyamide can be semi-aromatic amorphous and is chosen from:

6.I, 8.I, 9.I, 10.I, 11.I, 12.I, 6.I/9.I, 9.I/10.I, 9.I/11.I, 9.I/12.I, 9/6.I, 10/6.I, 11/6.I, 12:6.I, 10/9.I, 10/10.I, 10/11.I, 10/12.I, 11/9.I, 11/10.I, 11/11.I, 11/12.I, 12/9.I, 12/10.I, 12/11.I, 12/12.I, 6.10/6.I, 6.12/6.I, 9.10/6.I, 9.12/6.I, 10.10/6.I, 10.12/6.I, 6.10/9.I, 6.12/9.I, 10.10/9.I, 10.12/9.I, 6.10/10.I, 6.12/10.I, 9.10/10.I, 9.12/10.I, 10.10/10.I, 10.12/10.I, 10I/6I, 6.10/12.I, 6.12/12.I, 9.10/12.I, 9.12/12.I, 10.10/12.I, 11.6.I/9.I, 11/6.I/10.I, 11/6.I/11.I, 11/6.I/12.I, 11/9.I/10.I, 11/9.I/11.I, 11/9.I/12.I, 11/10.I/11.I, 11/10.I/12.I, 11/11.I/12.I, 6.I/10.I, 6.I/11.I, 6.I/12.I, 10.I/11.I, 10.I/12.I, 11.I/12.I, 12/6.I/10.I, 12/6.I/11.I, 12/6.I/12.I, 12/9.I/10.I, 12/9.I/11.I, 12.9.I/12.I, 12/10.I/11.I, 12/10.I/12.I, 12/11.I/12.I, 12/11.I/12.I, the preceding terpolymer polyamides with 12/ replaced with 9/, 10/, 6.10/, 6.12/, 10.6/, 10.10/, 10.12/, 9.10/ and 9.12/, all the polyamides mentioned above, with isophthalic (I) partially replaced up to 40 mol % with terephthalic (T), naphthalene-2,6-dicarboxylic and/or with 1,3- or 1,4-CHDA (cyclohexanedicarboxylic acid), with all or some of the linear aliphatic diamines possibly being replaced with branched aliphatic diamines, preferably among trimethylhexamethylenediamine TMD, methylpentamethylenediamine MPMD, methyloctamethylenediamine (MOMD) or with cycloaliphatic diamines, preferably among BMACM, BACM and/or IPD or arylaliphatic diamines, preferably m- or p-xylylenediamines, all the polyamides mentioned above where isophthalic (I) is partially or totally replaced with a linear or branched $C_6$ to $C_{18}$ aliphatic diacid and at the same time with total or partial replacement of the aliphatic diamine with a cycloaliphatic diamine among BMACM, BACM and/or IPD.

BMACM is bis(3-methylaminocyclohexyl)methane, BACM is bis(aminocyclohexyl)-methane and IPD or also denoted IPDA) is isophorone diamine.

More particularly, said polymer is semi-crystalline with a melting point Mp greater than 90° C., preferably of at least 100° C., and the particles of said dispersion have a number-average size ranging from 50 to 5000 nm and preferably from 50 to 500 nm. The measurement is carried out using a laser particle size analyzer.

The glass transition temperature Tg of the polymers used is measured by means of a differential scanning calorimeter (DSC), after a second round of heating, according to standard ISO 11357-2. The heating and coding rate is 20° C./min. The melting point Mp and the crystallization temperature Tc are measured by DSC, after a first heating operation, according to standard ISO 11357-3. The heating and cooling rate are 20° C./min.

With regard to the content by dry weight of said polymer relative to the dry weight of said fibers+polymer, it can range from 0.5% to less than 50%. Said content by weight preferably ranges from 0.5% to 10% when said impregnation is limited to the consolidation of said fibers to one another, in addition to sizing. In the case of the consolidation of the fibers, their cohesion energy increases due to the binding of said fibers to one another at the core of the fiber bundle. In the case of sizing, the desired effect is different and is related to a compatibilization of said fibers with the polymer matrix of the composite by the interface created around the fibers with a specific polymer improving the compatibility of the fibers with the matrix for better adhesion of the fibers to the polymer matrix of the composite material. However, it is possible that by consolidating the rovings of fibers, by virtue of the present invention, better compatibilization of the fibers with the matrix is also obtained.

Said content can be greater than 25% and less than 50%, preferably from 30% to 45% when said impregnation serves to consolidate said fibers and in addition to prepare a prepreg of said fibers that can be used in the manufacture of composite materials.

The viscosity of said dispersion at 23° C. can range from 10 to 1000 mPa·s. The viscosity is measured by the Brookfield method (Brookfield viscosity according to ISO 2555).

According to one particular case, said polymer is biobased and in particular is a (co)polyamide based on biobased monomers. The term "(co)polyamide based on" means here that it comprises at least one monomer which is biobased.

In particular, said fibers are long fibers, in particular long flax fibers with L/D>2000.

Said rovings or ribbons are based on flax fibers which can have a tex (linear weight expressed in tex) ranging from 10 to 10 000 and preferably from 100 to 4000 and even more preferentially from 500 to 1500.

More particularly, said rovings or ribbons of fibers thus treated are reinforcing fibers, in particular reinforcing flax fibers, of low linear density for the manufacture of polymer matrix composites, in particular thermoplastic matrix composites, more particularly for a polyamide thermoplastic matrix, even more particularly for a polyamide matrix based on PA 11, PA10.10, PA 6.10 and PA 10.I/6.I. The term "low linear density" means significantly lower than that of the glass fiber which is the most commonly used for producing composites.

Said polymer of said aqueous treatment dispersion can in particular be chosen according to said matrix of said composite material. Thus, said polymer can be identical to said thermoplastic matrix polymer of said composite material. It can be different than said thermoplastic matrix polymer, but in this case it is compatible with said matrix polymer of said composite material.

The dispersion according to the invention for the impregnation and more particularly for the consolidation of the natural fibers with one another, in particular of the flax fibers, can be used according to a process which comprises a step of impregnating said rovings or said ribbons of said fibers for impregnation, followed by a step of drying by means of a heating system, with, during said drying, the gradual elimination of the water and, as the drying proceeds, the melting of said polymer, the coating of said rovings or ribbons with said molten polymer incorporated at the core of the bundle of the fibers of said rovings or of said ribbons, binding said fibers to one another, an optional drying step followed by final forming of said rovings or ribbons thus treated and, finally, a step of cooling said rovings or said ribbons thus treated.

The impregnating step can be carried out by immersion (dipping) of said rovings or of ribbons of said fibers in a bath comprising said dispersion, or by spraying said aqueous dispersion of polymer according to the invention onto said rovings or ribbons in a spraying device. Said starting dispersion can also be used diluted in water with the dry extract or content of polymer of the final dispersion used being in the range defined above and ranging from 5% to 50% by weight. The immersion and the impregnation can be carried out continuously or batchwise with a residence time that is variable in said immersion and impregnation bath and adjustable according to the polymer content targeted, which means that, the shorter the residence time, the lower the polymer content relative to said fibers. It is possible to define a limiting residence time at the end of which the impregnated polymer content reaches a limit for a given impregnation temperature that can range from ambient temperature (20° C.) up to 70° C. Similarly, said impregnation can be carried out by spraying said aqueous dispersion in a spraying device comprising a spray, with said spraying possibly also being carried out continuously and the polymer content possibly being adjusted by the residence time in this spraying device, via the spray flow rate of said device and via the dry extract of said dispersion. Drying by means of a heating system, for example by infrared radiation, can allow gradual drying by elimination of the water and, as the drying progresses, softening or melting of said polymer in order to thus allow it to coat said fibers at the core of the bundle of the fibers in said rovings or ribbons thus impregnated. It is possible, after this step, to have forming of said rovings or ribbons thus treated in the form of unidirectional ribbons or of preimpregnated fabrics or in the form of assemblies, in particular preforms. In the forming step, it is preferably in a flattened form of unidirectional ribbons or of rovings with a cylindrical cross section in the form of pre-impregnated fabrics or in the form of an assembly of ribbons, in particular for producing preforms.

A calibration die can be used to calibrate the sizes of said ribbons, which can have widths of less than 2000 mm, preferably less than 200 mm and in particular between 5 and 50 mm.

Finally, the treated rovings or ribbons are left to cool in order to finish the consolidation of the fibers before optional winding.

The examples which follow are presented by way of illustration of the invention and of the performance levels thereof and in no way limit the scope thereof.

1—EXAMPLES

In order to carry out the impregnation treatment with an aqueous solution of copolyamide, 10 l of several solutions (aqueous dispersions of copolyamide) were produced in a laboratory reactor.

The copolyamides used are the Arkema commercial products Platamid® 2592 and Platamid® 1657.

Their essential characteristics are presented in Table I below.

TABLE I

| Platamid ® | Melting point | —COOH functionality (µeq/g) |
|---|---|---|
| 2592 | 102 | 220 |
| 1657 | 107 | 180 |

These products were introduced in dry powder form into a solution of water with sodium hydroxide (1% relative to the Platamid®). The final dry extract (DE) is 30%.

The reagents are charged to the reactor, and then the medium is inerted with nitrogen. The reagents are heated so as to reach the material temperature of 150° C. This heating phase is carried out with stirring at 1000 rpm. Between 100 and 120° C., the medium becomes homogeneous, white and opaque. The medium is kept stirring at 1000 rpm for 30 min at 150° C., then cooled with stirring at 300 rpm. The dispersions obtained are fluid, white and opaque.

The particle size (size of the particles) of the powders was measured by means of observations made by scanning electron microscopy and also using the laser diffraction particle size analysis method. The 2 types of measurements are in agreement. The data indicated in the table below were obtained with the laser diffraction particle size analysis method.

The particle size, the viscosity and the dry extract of the dispersions used are presented in Table II below.

TABLE II

| Test REF | Platamid ® of the dispersion | Number-average diameter of the particles (nm) | Brookfield* viscosity at 23° C. (mPa · s) | Dispersion dry extract (%) |
|---|---|---|---|---|
| EP-053 | Platamid ® 2592 | 80 | 30 | 30 |
| EP-064 | Platamid ® 1657 | 140 | 20 | 30 |

*the measurement was carried out with a No. 1 spindle at 60 rpm.

These aqueous dispersions thus prepared were then used on the flax fiber treatment line, in non-diluted or diluted form.

Except for Example 7, in which the impregnation method is specified, in all the other cases (unless specifically specified for each example), said impregnation was carried out by on line (continuous) spraying using a spraying device (spray) with a residence time in the jet of said spray of approximately 1 s. The drying is carried out by heating with an IR device. The cooling is carried out in the open air.

The $1^{st}$ series of tests was carried out on a flax roving (of fibers) of high count or grammage of 2190 tex, with various treatments:

Counter Example 1: non-impregnated roving of 2190 tex.
Example 1: EP-063 ND: impregnation with a non-diluted solution (DE: 30% of Platamid® 2592.
Example 2: EP-063 D50: impregnation with a dispersion, diluted to 50%, of Platamid® 2592 (DE: 15%).
Example 3: EP-064 ND: impregnation with a non-diluted dispersion of Platamid® 1657 (DE: 30%),
Example 4: EP-064 D50: impregnation with a dispersion, diluted to 50%, of Platamid® 1657 (DE: 15%).

The $2^{nd}$ series of tests was carried out on a flax roving of low count (1030 tex) having undergone a treatment with Platamid® 1657, at various degrees of impregnation.

Counter Example 2: non-impregnated roving of low count (0% polymer).
Example 5: impregnation with a 4-fold diluted solution with DE: 7.5%.
Example 6: impregnation twice successively (2 passes) with the dispersion of Example 5.
Example 7: impregnation by immersion (dipping) in the aqueous dispersion with a longer residence time (10 s).

2—TENSILE MECHANICAL PROPERTIES 2.1—Test Conditions
Non-conditioned samples
Temperature: 23° C.

The flax roving 1 is glued (with Loctite® 401 glue) onto a cardboard frame 2 (according to FIG. 1). The reference length L0 was chosen at 14 mm, in the knowledge that the average length of a flax fiber is approximately 30 mm. The upper and lower edges of the cardboard frame 2 are held tight between the jaws of the dynamometer (Zwick machine)

while the side edges are out. The roving 1 is then subjected to a tensile force at a speed of 1 mm/min (displacement of the crosshead).

2.2—Results

In order to compare the rovings weakly impregnated with resin (up to 10% of polymer), the breaking force of the various samples tested is measured. The results are presented in Table III below.

TABLE III

| Reference | Counter Example 1 | Example 1 | Example 2 | Example 3 | Example 4 |
|---|---|---|---|---|---|
| Impregnation type | Non-impregnated | EP63-ND | EP63-D50 | EP64-ND | EP64-D50 |
| Resin content (% by weight) | 0 | 2-10% | 2-10% | 2-10% | 2-10% |
| Number of samples | 5 | 8 | 5 | 5 | 5 |
| Mean breaking force (N) | 443 | 775 | 723 | 888 | 770 |
| Standard deviation | 33 | 98 | 68 | 23 | 73 |

It is shown in Table III that the impregnation with a copolyamide dispersion makes it possible to very significantly increase the breaking force of the flax fiber roving.

The two dispersions give results that are similar and along the lines of a consolidation (Examples 2 and 3 as opposed to Counter Example 1), thereby demonstrating that the consolidation dispersion proposed functions, including for dilutions of 50% (which corresponds to a dry extract of 15%).

Table IV below gives the result of the various impregnations with Platamid® 1657 and a roving of low grammage or count (1030 tex). It is noted that, with a 4-fold dilution with a final dry extract of 7.5%, a breaking force is obtained that is equivalent to that obtained with the non-impregnated roving of high count (2190 tex) (comparison of Example 5 with Counter Example 1): it has thus been demonstrated that the use of a copolyamide dispersion as defined above makes it possible to use a flax fiber roving that has half the count of the initial roving (1030 tex compared with 2190 tex), while at the same time retaining approximately the same mechanical strength (approximately the same breaking force).

It is also shown that, by performing several impregnation passes (by spraying) with the same dispersion, the copolyamide content in the final roving is increased (comparison between Examples 5 and 6).

To finish, it is shown, by means of an immersion (dipping) impregnation test with a much longer spraying time (10 s), that it is possible to impregnate the roving with close to 40% (by weight) of copolyamide (Example 7). This content corresponds to a resin (polymer) content found in usual pre-impregnated reinforcements, making it possible to thus directly produce composite parts, for example by thermocompression, without having to carry out an additional operation of impregnating the fibrous reinforcement.

The possibility, with the process according to the invention, of directly producing a composite semi-product of prepreg type that is ready to use is thus demonstrated.

TABLE IV

| Reference | Counter Example 2 | Example 5 | Example 6 | Example 7 |
|---|---|---|---|---|
| Impregnation type | Non-impregnated | Product diluted 4-fold (DE: 7.5%) | Product diluted 4-fold (DE: 7.5%) with 2 passes | Immersion impregnation for 10 s |
| Polymer content (% by weight/fiber + polymer) | 0 | 2.7 | 5.3 | 39.8 |
| Number of samples | 5 | 5 | 5 | 3 |
| Mean breaking force (N) | 202 | 449 | 549 | 948 |
| Standard deviation | 15 | 49 | 65 | 49 |

The invention claimed is:

1. A method of reinforcing rovings or ribbons of natural fibers comprising impregnating the rovings or ribbons of natural fibers with an aqueous polymer dispersion of polymer particles comprising at least one polymer selected from the group consisting of an amorphous polymer having a Tg ranging from 50° C. to 175° C. and a semi-crystalline polymer having a melting point ranging from 70° C. to 220° C., wherein said polymer:
   is incorporated into a core of a bundle of fibers making up said rovings or ribbons of natural fibers and thus binding said fibers to one another,
   is present in said aqueous polymer dispersion in a content by weight ranging from 5% to 50% with the polymer particles in dispersion having a number-average size of less than 10000 nm, and
   is selected from the group consisting of copolyamides, polyesters, polyurethanes, poly(meth)acrylates including copolymers, polyolefins, and fluorinated polymers including fluorinated copolymers.

2. The method of claim 1, wherein said polymer is selected from the group consisting of poly(meth)acrylates including copolymers functionalized with acid functions and fluorinated polymers including fluorinated copolymers grafted with reactive functions, and
   wherein said aqueous polymer dispersion is an aqueous polymer dispersion obtained by emulsion polymerization in the presence of a surfactant and wherein said reactive functions can react with said natural fibers.

3. The method of claim 1, wherein said polymer is a polyurethane formed from an ionic polyisocyanate prepolymer dispersed in water with a chain extension in an aqueous medium.

4. The method of claim 1, wherein said polymer is dispersible or dispersed in powder form in an aqueous medium without surfactant and said polymer in the powder state bears ionic groups or groups that are precursors of ionic groups.

5. The method of claim 4, wherein said polymer is a copolyamide.

6. The method of claim 5, wherein said copolyamide bears amine groups.

7. The method of claim 5, wherein said copolyamide bears carboxy groups which are neutralized in salt form by a base.

8. The method of claim 5, wherein said copolyamide is semi-crystalline and has a melting point ranging from 70° C. to 150° C.

9. The method of claim 5, wherein said copolyamide comprises at least one repeating unit selected from the group consisting of: 5.9, 5.10, 5.12, 5.13, 5.14, 5.16, 5.18, 5.36, 6, 6.9, 6.10, 6.12, 6.13, 6.14, 6.16, 6.18, 6.36, 9, 10.6, 10.9, 10.10, 10.12, 10.13, 10.14, 10.16, 10.18, 10.36, 11, 12, 12.6, 12.9, 12.10, 12.12, 12.13, 12.14, 12.16, 12.18, 12.36, 6.6/6, 11/10.10 and mixtures thereof.

10. The method of claim 5, wherein said copolyamide is selected from the group consisting of: PA 6/6.6/12, PA 6/6.6/11/12, PA 6/12, PA 6.9/12, PA Pip.9/Pip.12/11, PA 6/IPD.6/12, PA IPD.9/12, PA6/MPMD.12/12, PA 6/6.12/12, PA 6/6.10/12, PA 6/Pip.12/12, PA 6/6.6/6.10/6.1, PA 6.10/Pip.10/Pip.12, PA 6/11/12, PA Pip.12/12, PA IPD.10/12, PA Pip.10/12, PA 6/11, PA Pip.10/11/Pip.9, PA 6/6.6/6.10, PA 6/6.10/6.12 and mixtures thereof.

11. The method of claim 5, wherein said copolyamide is semi-aromatic amorphous and is selected from the group consisting of: (i) 6.1, 8.1, 9.1, 10.1, 11.1, 12.1, 6.1/9.1, 9.1/10.1, 9.1/11.1, 9.1/12.1, 9/6.1, 10/6.1, 11/6.1, 12:6.1, 10/9.1, 10/10.1, 10/11.1, 10/12.1, 11/9.1, 11/10.1, 11/11.1, 11/12.1, 12/9.1, 12/10.1, 12/11.1, 12/12.1, 6.10/6.1, 6.12/6.1, 9.10/6.1, 9.12/6.1, 10.10/6.1, 10.12/6.1, 6.10/9.1, 6.12/9.1, 101/61, 10.10/9.1, 10.12/9.1, 6.10/10.1, 6.12/10.1, 9.10/10.1, 9.12/10.1, 10.10/10.1, 10.12/10.1, 6.10/12.1, 6.12/12.1, 9.10/12.1, 9.12/12.1, 10.10/12.1, 11/6.1/9.1, 11/6.1/10.1, 11/6.1/11.1, 11/6.1/12.1, 11/9.1/10.1, 11/9.1/11.1, 11/9.1/12.1, 11/10.1/11.1, 11/10.1/12.1, 11/11.1/12.1, 6.1/10.1, 6.1/11.1, 6.1/12.1, 10.1/11.1, 10.1/12.1, 11.1/12.1, 12/6.1/10.1, 12/6.1/11.1, 12/6.1/12.1, 12/9.1/10.1, 12/9.1/11.1, 12.9.1/12.1, 12/10.1/11.1, 12/10.112.1, 12/11.1/12.1, 12/11.1/12.1, (ii) terpolymer polyamides from (i) with 12/ replaced with 9/, 10/, 6.10/, 6.12/, 10.6/, 10.10/, 10.12/, 9.10/ and 9.12/, (iii) polyamides (i) or (ii), with isophthalic (1) partially replaced up to 40 mol % with terephthalic (T), naphthalene-2,6-dicarboxylic and/or with 1,3- or 1,4-CHDA (cyclohexanedicarboxylic acid), optionally with the linear aliphatic diamines being replaced with branched aliphatic diamines, and (iv) polyamides from (i) or (ii) where isophthalic (1) is partially or totally replaced with a linear or branched $C_6$ to $C_{18}$ aliphatic diacid and at the same time with total or partial replacement of the aliphatic diamine with bis(3-methylaminocyclohexyl)methane, bis(aminocyclohexyl)-methane and/or isophorone diamine.

12. The method of claim 1, wherein said polymer is semi-crystalline with a melting point ranging from greater than 90° C. up to 220° C., and wherein the polymer particles of said aqueous polymer dispersion have a number-average size ranging from 50 to 5000 nm.

13. The method of claim 1, wherein the content by dry weight of said polymer relative to the dry weight of said fibers and polymer ranges from 0.5% to less than 50%.

14. The method of claim 13, wherein said content by weight ranges from 0.5% to 10%.

15. The method of claim 13, wherein said content is greater than 25% and less than 50%.

16. The method of claim 1, wherein the viscosity of said aqueous polymer dispersion at 23° C. ranges from 10 to 1000 mPa·s.

17. The method of claim 1, wherein said polymer is also biobased.

18. The method of claim 1, wherein said fibers are long flax fibers with L/D>2000.

19. The method of claim 1, wherein said rovings or ribbons are based on flax fibers having a tex ranging from 10 to 10,000.

20. The method of claim 1, wherein said rovings or ribbons of fibers are reinforcing fibers.

* * * * *